(12) United States Patent
Doman

(10) Patent No.: US 6,227,062 B1
(45) Date of Patent: May 8, 2001

(54) TRANSMISSION SYSTEM ELECTRICAL CONNECTOR MONITORING SYSTEM

(75) Inventor: Joseph P. Doman, Augusta, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/447,719

(22) Filed: Nov. 23, 1999

(51) Int. Cl.[7] .................................................. G01R 31/02
(52) U.S. Cl. .............................. 74/335; 477/906; 324/503
(58) Field of Search ................................. 74/335, 336 R, 74/337; 477/138, 163, 906; 324/503

(56) References Cited

U.S. PATENT DOCUMENTS

| | | | |
|---|---|---|---|
| 4,207,610 | * 6/1980 | Gordon | 324/503 |
| 4,207,611 | * 6/1980 | Gordon | 324/503 |
| 4,784,007 | 11/1988 | Ishida et al. | 74/335 |
| 4,873,881 | 10/1989 | Edelen et al. | 74/336 |
| 5,172,062 | * 12/1992 | Eisermann | 324/503 |
| 5,272,441 | 12/1993 | Wright et al. | 324/546 |
| 5,530,360 | * 6/1996 | Kerchaert et al. | 324/503 |
| 5,661,998 | 9/1997 | Genise | 318/599 |
| 5,802,915 | 9/1998 | Organek et al. | 74/331 |
| 5,973,499 | * 10/1999 | Schulmann | 324/503 |

* cited by examiner

*Primary Examiner*—Sherry Estremsky
(74) *Attorney, Agent, or Firm*—Howard D. Gordon

(57) ABSTRACT

A control for sensing impending and existing electrical connection faults in a vehicular transmission control circuit (42) including a plurality of individually energized and de-energized electrical devices such as electric motors (36 and 38) and solenoid-controlled valves (24 and 30). A voltage monitor (46) senses voltage drop across a power source (44) for properly operating devices and compares it to an expected voltage drop (REF) to determine if an electrical connection fault condition exists.

11 Claims, 3 Drawing Sheets

TRANSMISSION SYSTEM ELECTRICAL CONNECTOR MONITORING SYSTEM

BACKGROUND OF THE INVENTION

1. Field of the Invention

The present invention relates to a control for a vehicular transmission system for monitoring the electrical connectors and wiring utilized to electrically connect selectively energized electrical devices, such as solenoids, electric motors and the like, to a power source.

2. Description of the Prior Art

Manual and full or partially automated vehicular transmission systems utilizing electrical devices, such as solenoid-controlled valves and/or electric motors to control transmission and/or master clutch operation, are known in the prior art.

U.S. Pat. Nos. 4,590,817; 4,784,007; 4,796,485; 4,621,328; 5,661,998 and 5,795,264, the disclosures of which are incorporated herein by reference, illustrate piston/cylinder shifting devices controlled by solenoid-controlled valves.

U.S. Pat. Nos. 4,817,468; 4,873,881; 5,481,170 and 5,729,110, the disclosures of which are incorporated herein by reference, illustrate X-Y shifters controlled by electric motors and ball-screw-type devices.

U.S. Pat. Nos. 5,435,201; 5,651,437; 5,505,285; 5,802,915 and 5,810,141, the disclosures of which are incorporated herein by reference, illustrate electric motor-actuated ball ramp actuators for transmissions and friction clutches.

Controls for determining if the transmission system electrical actuator devices are properly operating are known, as may be seen by reference to U.S. Pat. No. 5,272,441, the disclosure of which is incorporated herein by reference.

The prior art controls for vehicular transmission controls were not totally satisfactory as, assuming the electrical devices were operating substantially correctly, i.e., were performing the intended function thereof, it was difficult to determine if the electrical connections or wires connecting the electrical devices to the power source were deteriorating due to looseness or corrosion, etc., and in need of service, repair or replacement.

SUMMARY OF THE INVENTION

In accordance with the present invention, the drawbacks of the prior art are minimized or overcome by the provision of a control for a vehicular transmission system which will monitor the condition of electrical wiring and connections, will provide warnings, prior to failure, of a need for inspection and/or repair, and, in a preferred embodiment, will have the ability to identify the specific electrical connection needing attention.

The correct operation and draw (voltage drop across) of the actuated electrical devices is predetermined, as is the expected draw (voltage drop across) of the electrical connections (wiring and connectors) thereto. The sum of these voltage drops for the currently energized devices is an expected sum or reference value and is compared to a measured voltage drop across the power supply and, if the measured actual voltage drop exceeds the expected sum by greater than a predetermined amount, a connection problem is declared and the operator may be notified.

As various combinations of electrical devices are utilized for different transmission operations, it may be possible to identify the specific electrical connection needing attention.

This and other objects and advantages of the present invention will become apparent from a reading of the following description of the preferred embodiment taken in connection with the attached drawings.

DESCRIPTION OF THE PREFERRED EMBODIMENT

Figure 1:
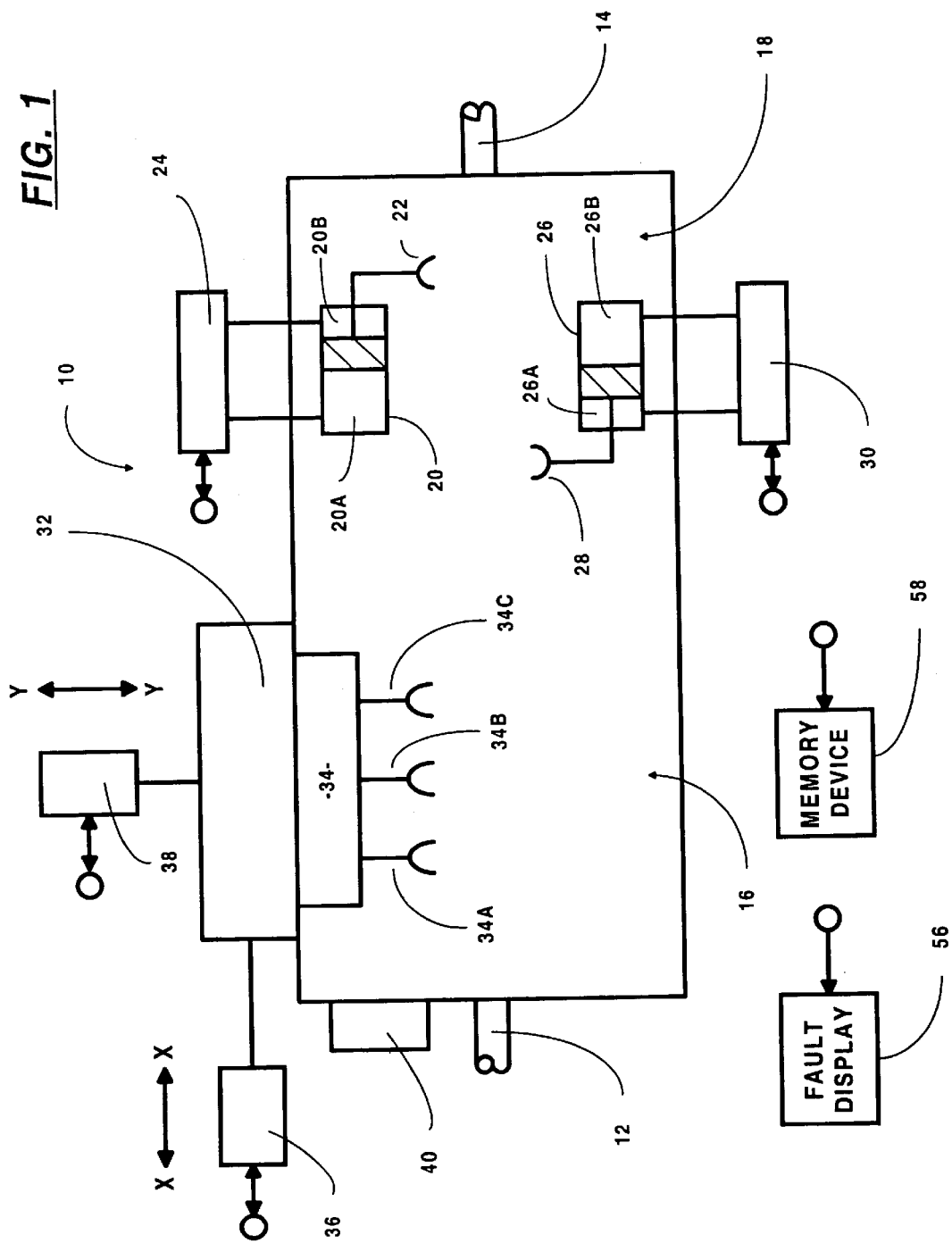
FIG. 1 is a schematic illustration of a multiple-speed, combined splitter-and-range, compound transmission using electrical device actuators.

A vehicular compound mechanical transmission 10 is schematically illustrated in FIG. 1. Transmission 10 includes an input shaft 12 driven by an internal combustion engine (not shown) through a coupling such as a master friction clutch (not shown) or torque converter (not shown) and an output shaft 14 for connection to a drive axle (not shown).

Transmission 10 includes a main transmission section 16 and an auxiliary section 18 including range-and-splitter gearing. Transmissions of this type are well known and may be seen by reference to U.S. Pat. Nos. 5,320,013 and 4,754,665, the disclosures of which are incorporated herein by reference. The present invention is also applicable to simple transmissions, range-only compound transmissions, and splitter-only compound transmissions.

A first piston/cylinder assembly 20, including a shift fork 22, is provided for shifting the range gearing. A first solenoid-controlled valve 24 is provided to control operation of range shifting by selectively pressurizing and venting the chambers 20A and 20B of the first piston/cylinder assembly.

A second piston/cylinder assembly 26, including a shift fork 28, is provided for shifting the splitter gearing. A second solenoid-controlled valve 30 is provided to control operation of splitter shifting by selectively pressurizing and venting the chambers 26A and 26B of the second piston/cylinder assembly.

The main transmission section 16 is shifted by an "X-Y" shifting mechanism 32 acting on a shift bar housing or shift shaft 34 (see U.S. Pat. Nos. 5,893,293; 4,920,815 and 5,743,143, the disclosures of which are incorporated herein by reference). Typically, the shift shaft 34 will position a plurality of shift forks 34A, 34B and 34C to selectively engage and disengage jaw clutch members (not shown). X-Y shifting mechanisms are well known and are illustrated in aforementioned U.S. Pat. Nos. 4,784,007; 4,796,485 and 4,873,881.

A first electric motor 36 is provided to control X—X position, while a second electric motor 38 is provided to control Y-Y position, in actuator 32. Motors 36 and 38 are typically, but not necessarily, DC motors.

The transmission 10 also may include an electric motor-operated ball ramp actuator 40 (see aforementioned U.S. Pat. Nos. 5,802,915; 5,528,950 and 5,810,141) to operate the master clutch, an inertia brake (not shown) or the like. Other electrical devices, such as upshift brake actuators and/or power takeoff actuators, may be utilized with transmission 10.

Figure 2:
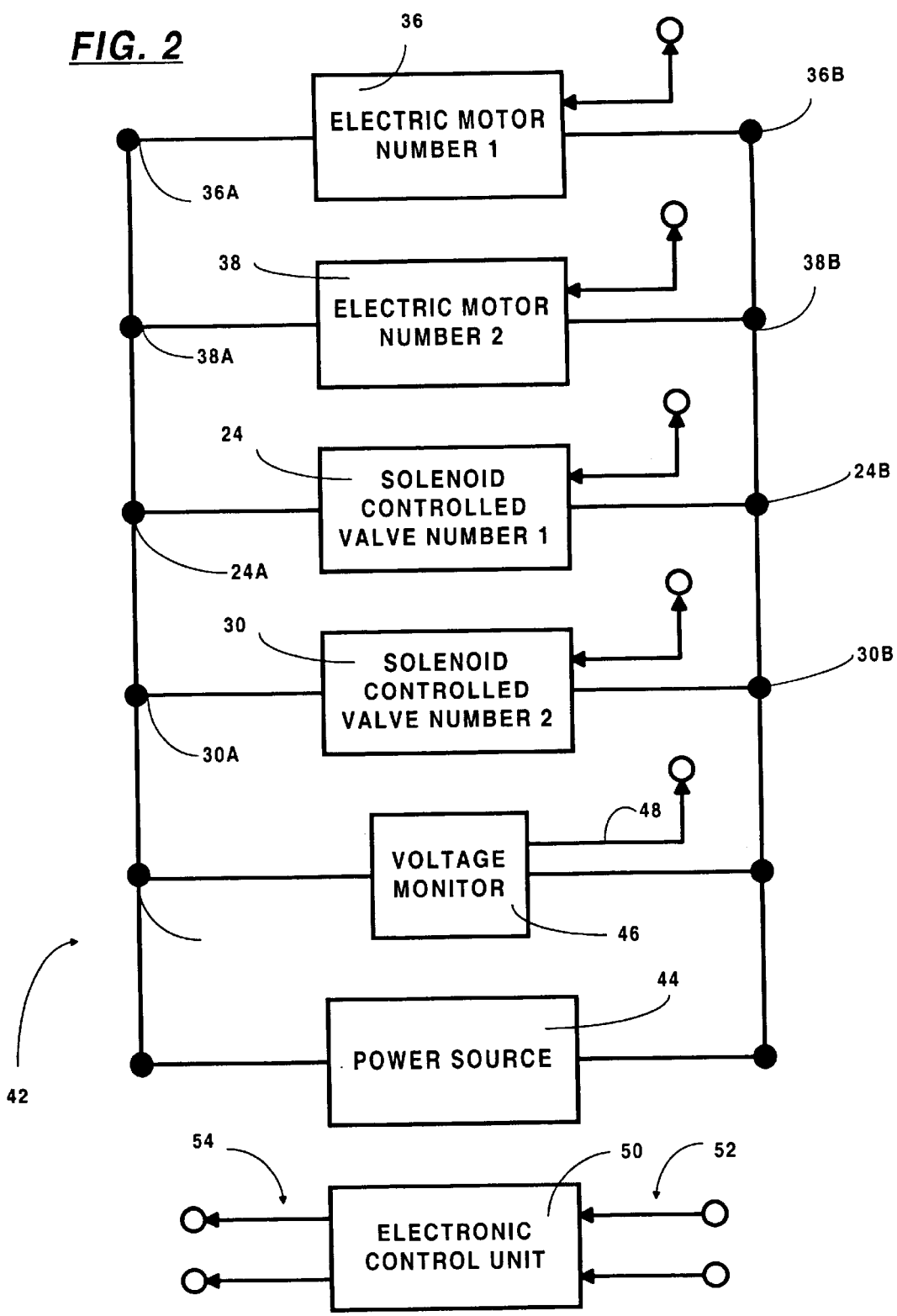
FIG. 2 is a schematic illustration of the circuit used to connect the electrical devices in FIG. 1 according to the present invention.

FIG. 2 is a schematic illustration of the transmission system electrical circuit 42 including the vehicle power source 44, such as a generator and/or battery, and a voltage meter 46, which provides a signal 48 indicative of total voltage drop across the first and second valves 24 and 30 and the first and second electric motors 36 and 38.

A microprocessor-based ECU 50 receives input signals 52 and processes same according to logic rules ot issue command output signals 54. The ECU is effective to selectively energize and de-energize selected ones of the electrical devices and to monitor the proper operation thereof.

In the absence of a device fault, or corrosion or other deterioration at the connectors 30A, 30B, 24A, 24B, 38A, 38B, 36A or 36B, or wires leading to or from the associated devices, the draw of the energized device and connector is a known quantity. If the total voltage drop sensed by voltage monitor 46 exceeds the total expected voltage draw of the energized devices and associated connectors, and if the devices are determined to be operating correctly, this is an indication of a connector and/or wiring fault needing attention. By sensing the various combinations of energized devices and the presence or absence of connector faults in the various combinations, it may be possible to identify the specific electrical device having a failing connection.

Upon sensing an existing or impending electrical connection fault, a warning may be given to the operator and/or to a maintenance record. Preferably, the ECU will signal a display device, such as a warning light 56 and/or an onboard memory device 58, which may be downloaded periodically for maintenance purposes.

It has been seen that a typical solenoid, in a 12-to-14-volt vehicular system, under normal conditions, will have a voltage drop of about 0.1 to 0.2 volts, while the same solenoid will have a voltage drop of up to 1.0 volts or more if the connection is oxidized, loose or otherwise faulty.

Figure 3:
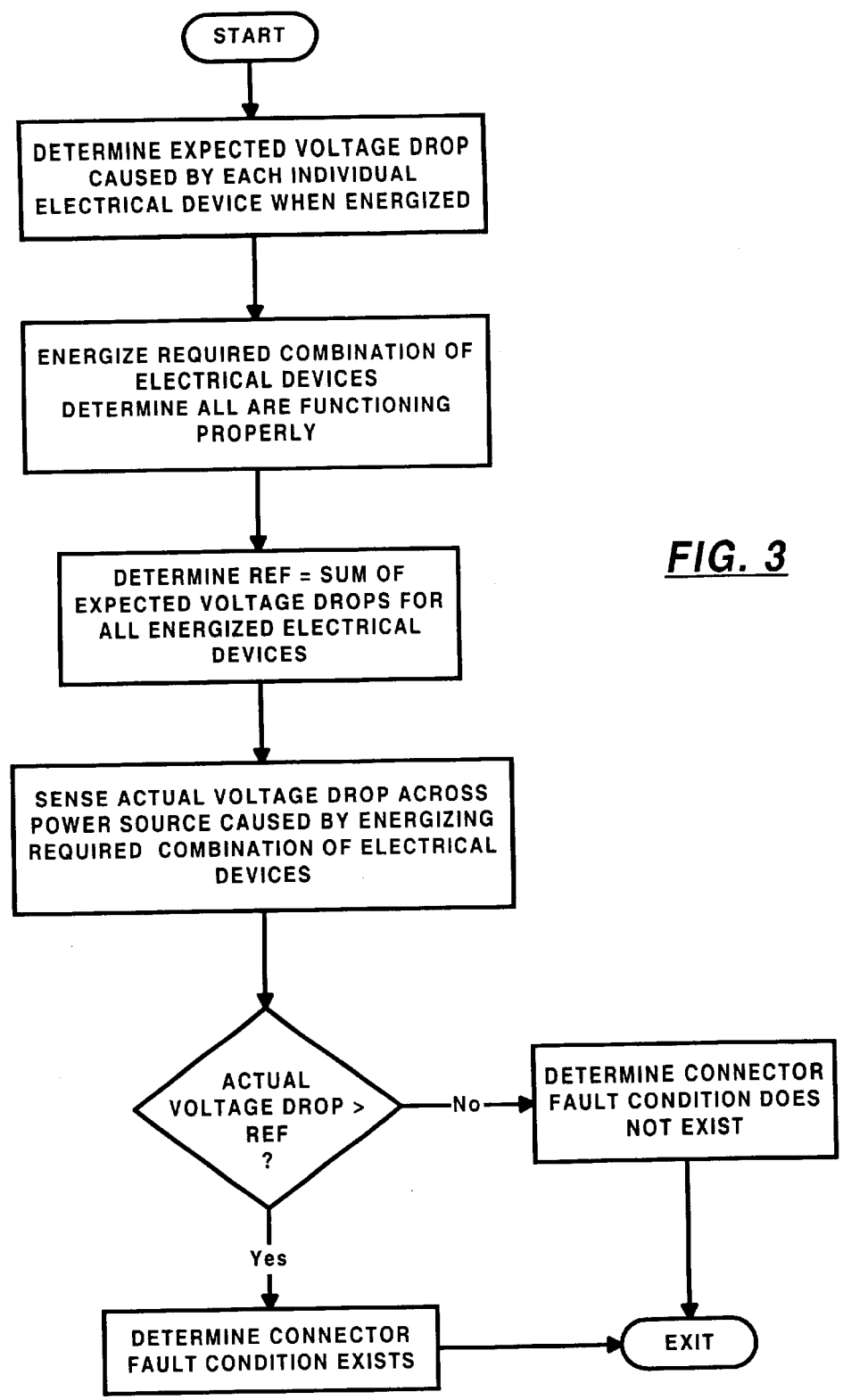
FIG. 3 is a schematic illustration, in flow chart format, of the present invention.

FIG. 3 is a flow chart representation of the present invention.

Accordingly, it may be seen that a new and improved control for sensing degraded electric connections prior to failure has been provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for monitoring electrical connections in a control circuit for a vehicular transmission having at least one selectively energized and de-energized electrical device, said electrical device causing a predetermined voltage drop if energized and if connected to a power source by electrical connections not requiring attention, said method comprising the steps of:

energizing said electrical device;

determining said electrical device is performing its intended function;

sensing the voltage drop caused by energizing said device;

comparing said sensed voltage drop to said predetermined voltage drop; and if said sensed voltage drop exceeds said predetermined voltage drop, determining that a possible electrical connection fault exists.

2. The method of claim 1 including the additional step of warning the vehicle operator of a possible electrical connection fault if it is determined that a possible electrical connection fault exists.

3. The method of claim 1 wherein said electrical device is an electric motor.

4. The method of claim 1 wherein said electrical device is a solenoid used to operate a solenoid-controlled valve.

5. The method of claim 1 including the additional step of sending an electrical connection fault message to a memory device if a determination is made that a possible electrical connection fault exists.

6. A control for controlling a vehicular transmission system (10) including a plurality of selectively energized and de-energized electrical devices (24, 30, 36, 38) electrically connected to a power source (44), a voltage monitor (46) for sensing a voltage drop across said power source and providing a signal (48) indicative thereof, a controller (50) for selectively energizing and de-energizing selected ones of said electrical devices, each of said electrical devices, when energized and if operating satisfactorily and connected to said power source by an electrical connection not requiring corrective attention, causing a predetermined expected voltage drop across said power source, said controller including logic rules effective:

(a) to energize a predetermined combination of said electrical devices;

(b) to determine that each of said energized electrical devices is functioning properly;

(c) to sense the total voltage drop across said power source caused by energizing said combination of electrical devices;

(d) to calculate a reference value equal to the sum of expected voltage drops for the energized electrical devices;

(e) to compare the sensed voltage drops to the reference value; and (f) if the sensed voltage drop exceeds the reference value, to determine an electrical connection fault condition exists.

7. The control of claim 6 wherein said system includes a fault warning device (56), and said logic rules are effective to warn of a fault if it is determined that an electrical connection fault condition exists.

8. The control of claim 6 wherein said electrical devices include electric motors.

9. The control of claim 6 wherein said electrical devices include solenoids.

10. The control of claim 6 wherein said logic rules are effective to send an electrical connection fault signal to a memory device (58) if an electrical connection fault condition is determined to exist.

11. The control of claim 6 wherein said logic includes rules to identify the specific electrical device having an electrical connection fault condition.

* * * * *